(12) United States Patent
Morikawa et al.

(10) Patent No.: US 10,065,179 B2
(45) Date of Patent: Sep. 4, 2018

(54) CERIA-ZIRCONIA-BASED COMPOSITE OXIDE AND METHOD FOR PRODUCING SAME, AND EXHAUST GAS PURIFICATION CATALYST INCLUDING CERIA-ZIRCONIA-BASED COMPOSITE OXIDE

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Akira Morikawa, Nagakute (JP); Kae Konishi, Nagakute (JP); Toshitaka Tanabe, Nagakute (JP); Akihiko Suda, Nagakute (JP); Masahide Miura, Toyota (JP); Isao Chinzei, Toyota (JP); Hiromasa Suzuki, Toyota (JP); Akiya Chiba, Shizuoka (JP); Kosuke Iizuka, Kakegawa (JP)

(73) Assignees: TOYOTA JIDOSHA KABUSHIKI KAISHA, Toyota-shi (JP); CATALER CORPORATION, Kakegawa-shi, Shizuoka-ken (JP)

( * ) Notice: Subject to any disclaimer, the term of this patent is extended or adjusted under 35 U.S.C. 154(b) by 74 days.

(21) Appl. No.: 14/910,378

(22) PCT Filed: Aug. 5, 2014

(86) PCT No.: PCT/IB2014/001462
§ 371 (c)(1),
(2) Date: Feb. 5, 2016

(87) PCT Pub. No.: WO2015/019156
PCT Pub. Date: Feb. 12, 2015

(65) Prior Publication Data
US 2016/0184801 A1    Jun. 30, 2016

(30) Foreign Application Priority Data

Aug. 9, 2013  (JP) ................... 2013-166336

(51) Int. Cl.
*B01J 23/10* (2006.01)
*B01J 37/00* (2006.01)
(Continued)

(52) U.S. Cl.
CPC .............. *B01J 23/10* (2013.01); *B01D 53/94* (2013.01); *B01J 23/002* (2013.01); *B01J 23/63* (2013.01);
(Continued)

(58) Field of Classification Search
CPC ....................................................... B01J 23/10
See application file for complete search history.

(56) References Cited

U.S. PATENT DOCUMENTS

2004/0092395 A1   5/2004 Hase et al.
2007/0155624 A1   7/2007 Wakita et al.
(Continued)

FOREIGN PATENT DOCUMENTS

CN    103038175 A    4/2013
JP    2004-066069 A  3/2004
(Continued)

*Primary Examiner* — Melvin C. Mayes
*Assistant Examiner* — Michael Forrest
(74) *Attorney, Agent, or Firm* — Hunton Andrews Kurth LLP

(57) ABSTRACT

A ceria-zirconia-based composite oxide containing a composite oxide of ceria and zirconia is provided, in which primary particles having a particle diameter of 1.5 to 4.5 μm account for, on a particle number basis, at least 50% of all primary particles in the ceria-zirconia-based composite (Continued)

| | Ce/Zr RATIO [MOLAR RATIO] | | PRESSURE APPLIED IN PRESS-MOLDING STEP | REDUCTION TREATMENT | | | | PARTICLE SIZE DISTRIBUTION OF CZ COMPOSITE OXIDE CONTENT OF PRIMARY PARTICLES (% PARTICLE NUMBER BASIS) | | | (14/29) VALUE | (28/29) VALUE | OXYGEN STORAGE CAPACITY OSC@ 600°C |
|---|---|---|---|---|---|---|---|---|---|---|---|---|---|
| | | | | FIRST REDUCTION TREATMENT | | SECOND REDUCTION TREATMENT | | | | | | | |
| | Ce | Zr | [kgf/cm²] | TEMPERATURE[°C] | TIME [h] | TEMPERATURE[°C] | TIME [h] | ~1.5μm | 1.5~4.5μm | 4.5μm~ | | | [μmol/g] |
| EXAMPLE 1 | 45 | 55 | 1500 | 1400 | 3 | 1600 | 2 | 27.6 | 56.2 | 16.2 | 0.015 | 0 | 180.4 |
| EXAMPLE 2 | 45 | 55 | 2000 | 1400 | 3 | 1600 | 2 | 32.7 | 55.0 | 12.3 | 0.017 | 0.001 | 192.6 |
| EXAMPLE 3 | 45 | 55 | 2000 | 1500 | 3 | 1700 | 2 | 23.0 | 55.1 | 21.9 | 0.029 | 0.011 | 196.4 |
| EXAMPLE 4 | 43 | 57 | 2000 | 1500 | 3 | 1700 | 2 | 25.2 | 54.2 | 20.6 | 0.026 | 0.010 | 186.2 |
| EXAMPLE 5 | 50 | 50 | 2000 | 1500 | 3 | 1700 | 2 | 25.0 | 57.4 | 17.6 | 0.028 | 0.062 | 197.5 |
| EXAMPLE 6 | 55 | 45 | 2000 | 1500 | 3 | 1700 | 2 | 26.9 | 58.6 | 14.5 | 0.027 | 0.070 | 181.5 |
| EXAMPLE 7 | 45 | 55 | 3000 | 1500 | 3 | 1700 | 2 | 4.4 | 84.4 | 11.2 | 0.036 | 0.059 | 215.6 |
| EXAMPLE 8 | 48 | 52 | 2000 | 1500 | 3 | 1700 | 2 | 15.2 | 71.4 | 13.4 | 0.030 | 0.061 | 208.4 |
| COMPARATIVE EXAMPLE 1 | 45 | 55 | 0 | 1500 | 3 | 1700 | 2 | 50.4 | 48.8 | 0.8 | 0.008 | 0.014 | 45.5 |
| COMPARATIVE EXAMPLE 2 | 45 | 55 | 500 | 1400 | 5 | – | – | 77.7 | 21.8 | 0.5 | 0.007 | 0.011 | 157.8 |
| COMPARATIVE EXAMPLE 3 | 45 | 55 | 2000 | 1700 | 5 | – | – | 38.7 | 48.5 | 12.8 | 0.025 | 0.006 | 164.1 |
| COMPARATIVE EXAMPLE 4 | 45 | 55 | 4000 | 1500 | 3 | 1700 | 2 | 4.0 | 80.2 | 15.8 | 0.034 | 0.086 | 144.5 |
| COMPARATIVE EXAMPLE 5 | 42 | 58 | 2000 | 1500 | 3 | 1700 | 2 | 27.5 | 55.4 | 17.1 | 0.014 | 0.004 | 160.1 |
| COMPARATIVE EXAMPLE 6 | 56 | 44 | 2000 | 1500 | 3 | 1700 | 2 | 28.7 | 50.5 | 20.8 | 0.029 | 0.092 | 162.2 | oxide, and the molar ratio of cerium to zirconium in the ceria-zirconia-based composite oxide is between 43:57 and 55:45.

2 Claims, 1 Drawing Sheet

(51) Int. Cl.
*B01J 37/12* (2006.01)
*B01J 37/14* (2006.01)
*B01J 37/03* (2006.01)
*B01J 23/00* (2006.01)
*B01D 53/94* (2006.01)
*B01J 37/16* (2006.01)
*B01J 23/63* (2006.01)
*B01J 35/00* (2006.01)
*B01J 35/02* (2006.01)
*C04B 35/626* (2006.01)
*C04B 35/488* (2006.01)
*C01G 25/00* (2006.01)
*C04B 35/50* (2006.01)
*B01J 37/08* (2006.01)

(52) U.S. Cl.
CPC ........... *B01J 35/002* (2013.01); *B01J 35/023* (2013.01); *B01J 37/0009* (2013.01); *B01J 37/0063* (2013.01); *B01J 37/03* (2013.01); *B01J 37/12* (2013.01); *B01J 37/14* (2013.01); *B01J 37/16* (2013.01); *C01G 25/00* (2013.01); *C04B 35/488* (2013.01); *C04B 35/50* (2013.01); *C04B 35/6261* (2013.01); *C04B 35/6265* (2013.01); *B01D 2255/407* (2013.01); *B01D 2255/908* (2013.01); *B01D 2255/9202* (2013.01); *B01J 37/0036* (2013.01); *B01J 37/08* (2013.01); *C01P 2002/36* (2013.01); *C01P 2002/50* (2013.01); *C01P 2002/72* (2013.01); *C01P 2006/12* (2013.01); *C04B 2235/3229* (2013.01); *C04B 2235/3244* (2013.01); *C04B 2235/443* (2013.01); *C04B 2235/5436* (2013.01); *C04B 2235/5463* (2013.01); *C04B 2235/604* (2013.01); *C04B 2235/661* (2013.01); *C04B 2235/664* (2013.01); *C04B 2235/76* (2013.01); *C04B 2235/80* (2013.01)

(56) References Cited

U.S. PATENT DOCUMENTS

| | | |
|---|---|---|
| 2008/0009410 A1 | 1/2008 | Okamoto et al. |
| 2012/0309616 A1 | 12/2012 | Yagishita et al. |
| 2013/0029840 A1 | 1/2013 | Morikawa et al. |

FOREIGN PATENT DOCUMENTS

| | | |
|---|---|---|
| JP | 2005-170774 A | 6/2005 |
| JP | 2008-013423 A | 1/2008 |
| JP | 2009-084061 A | 4/2009 |
| JP | 2011-219329 A | 11/2011 |
| WO | 2006/030763 A1 | 3/2006 |
| WO | 2010/010714 A1 | 1/2010 |
| WO | 2011/108457 A1 | 9/2011 |
| WO | 2011/129460 A1 | 10/2011 |

| | Ce/Zr RATIO [MOLAR RATIO] | | PRESSURE APPLIED IN PRESS-MOLDING STEP | REDUCTION TREATMENT | | | | PARTICLE SIZE DISTRIBUTION OF CZ COMPOSITE OXIDE CONTENT OF PRIMARY PARTICLES (%, PARTICLE NUMBER BASIS) | | | 1-(14/29) VALUE | 1-(28/29) VALUE | OXYGEN STORAGE CAPACITY OSC@ 600°C |
| --- | --- | --- | --- | --- | --- | --- | --- | --- | --- | --- | --- | --- | --- |
| | | | | FIRST REDUCTION TREATMENT | | SECOND REDUCTION TREATMENT | | | | | | | |
| | Ce | Zr | [kgf/cm²] | TEMPERA-TURE[°C] | TIME [h] | TEMPERA-TURE[°C] | TIME [h] | ~1.5 μm | 1.5~4.5 μm | 4.5 μm~ | | | [μmol/g] |
| EXAMPLE 1 | 45 | 55 | 1500 | 1400 | 3 | 1600 | 2 | 27.6 | 56.2 | 16.2 | 0.015 | 0 | 180.4 |
| EXAMPLE 2 | 45 | 55 | 2000 | 1400 | 3 | 1600 | 2 | 32.7 | 55.0 | 12.3 | 0.017 | 0.001 | 192.6 |
| EXAMPLE 3 | 45 | 55 | 2000 | 1500 | 3 | 1700 | 2 | 23.0 | 55.1 | 21.9 | 0.029 | 0.011 | 196.4 |
| EXAMPLE 4 | 43 | 57 | 2000 | 1500 | 3 | 1700 | 2 | 25.2 | 54.2 | 20.6 | 0.026 | 0.010 | 186.2 |
| EXAMPLE 5 | 50 | 50 | 2000 | 1500 | 3 | 1700 | 2 | 25.0 | 57.4 | 17.6 | 0.028 | 0.062 | 197.5 |
| EXAMPLE 6 | 55 | 45 | 2000 | 1500 | 3 | 1700 | 2 | 26.9 | 58.6 | 14.5 | 0.027 | 0.070 | 181.5 |
| EXAMPLE 7 | 45 | 55 | 3000 | 1500 | 3 | 1700 | 2 | 4.4 | 84.4 | 11.2 | 0.036 | 0.059 | 215.6 |
| EXAMPLE 8 | 48 | 52 | 2000 | 1500 | 3 | 1700 | 2 | 15.2 | 71.4 | 13.4 | 0.030 | 0.061 | 208.4 |
| COMPARATIVE EXAMPLE 1 | 45 | 55 | 0 | 1500 | 3 | 1700 | 2 | 50.4 | 48.8 | 0.8 | 0.008 | 0.014 | 45.5 |
| COMPARATIVE EXAMPLE 2 | 45 | 55 | 500 | 1400 | 5 | — | — | 77.7 | 21.8 | 0.5 | 0.007 | 0.011 | 157.8 |
| COMPARATIVE EXAMPLE 3 | 45 | 55 | 2000 | 1700 | 5 | — | — | 38.7 | 48.5 | 12.8 | 0.025 | 0.006 | 164.1 |
| COMPARATIVE EXAMPLE 4 | 45 | 55 | 4000 | 1500 | 3 | 1700 | 2 | 4.0 | 80.2 | 15.8 | 0.034 | 0.086 | 144.5 |
| COMPARATIVE EXAMPLE 5 | 42 | 58 | 2000 | 1500 | 3 | 1700 | 2 | 27.5 | 55.4 | 17.1 | 0.014 | 0.004 | 160.1 |
| COMPARATIVE EXAMPLE 6 | 56 | 44 | 2000 | 1500 | 3 | 1700 | 2 | 28.7 | 50.5 | 20.8 | 0.029 | 0.092 | 162.2 |

CERIA-ZIRCONIA-BASED COMPOSITE OXIDE AND METHOD FOR PRODUCING SAME, AND EXHAUST GAS PURIFICATION CATALYST INCLUDING CERIA-ZIRCONIA-BASED COMPOSITE OXIDE

CROSS-REFERENCE TO RELATED APPLICATIONS

This is a national phase application based on the PCT International Patent Application No. PCT/IB2014/001462 filed Aug. 5, 2014, claiming priority to Japanese Patent Application No. 2013-166336 filed Aug. 9, 2013, the entire contents of both of which are incorporated herein by reference.

BACKGROUND OF THE INVENTION

1. Field of the Invention

The invention relates to a ceria-zirconia-based composite oxide, a method for producing the composite oxide, and an exhaust gas purification catalyst that includes the ceria-zirconia-based composite oxide.

2. Description of Related Art

Composite oxides containing various metal oxides have hitherto been used as supports, promoters and the like for exhaust gas purification catalysts. Ceria has been used as a metal oxide within such composite oxides because it is capable of absorbing and releasing oxygen (has an oxygen storage capacity (OSC)) according to the partial pressure of oxygen in the atmosphere. In recent years, various types of composite oxides containing ceria have been studied and a variety of ceria-zirconia-based composite oxides and processes for their production have been disclosed.

For example, Japanese Patent Application Publication No. 2011-219329 (JP 2011-219329 A) discloses a ceria-zirconia-based composite oxide that includes a composite oxide of ceria and zirconia and a method for producing the same, the composite oxide being characterized in that the molar ratio of cerium to zirconium ([cerium]:[zirconium]) is in the range of 43:57 to 48:52 and also in that the intensity ratio between the diffraction line $2\theta=14.5°$ and the diffraction line $2\theta=29°$ (I(14/29) value) and the intensity ratio between the diffraction line at $2\theta=28.5°$ and the diffraction line at $2\theta=29°$ (I(28/29) value) determined from an x-ray diffraction pattern using the CuKα line obtained by x-ray diffractometry (XRD) after heating the composite oxide in the atmosphere for 5 hours at 1,100° C. satisfy the conditions: I(14/29)≥0.015 and I(28/29)≤0.08. According to this patent publication, it is possible to provide a ceria-zirconia-based composite oxide which has a high heat resistance and which, even after long-term exposure to elevated temperatures, is capable of exhibiting an excellent oxygen storage capacity. Recently, however, as increasingly higher properties are being required of exhaust gas purification catalysts, a desire has arisen for ceria-zirconia-based composite oxides which, by possessing both a sufficiently better oxygen storage capacity and a sufficiently higher heat resistance, are able to exhibit a sufficiently better oxygen storage capacity even after long-term exposure to elevated temperatures.

In addition, International Patent Application No. 2006/030763 (WO 2006/030763) discloses both a ceria-zirconia-based composite oxide which is a composite oxide containing cerium and zirconium and which is characterized by having (1) an oxygen release onset temperature of 380° C. or less, (2) an oxygen release amount of 485 µmol/g or more, and (3) an oxygen release amount at 400° C. of 15 µmol/g or more; and also a method of producing ceria-zirconia-based composite oxides which includes mixing a cerium source with a zirconium source in a given proportion, melting the resulting starting material mixture at a temperature not lower than the melting point, then cooling the melt to form an ingot, subsequently grinding the ingot as desired to obtain a powder, then removing strain within the powder crystals by heating, and grinding the powder more finely. However, the ceria-zirconia-based composite oxide disclosed in WO 2006/030763 does not have an adequate oxygen storage material deterioration-inhibiting effect, does not always sufficiently manifest an oxygen absorption/release function after long-term exposure to elevated temperatures, and has an insufficient durability.

SUMMARY OF THE INVENTION

This invention was arrived at in light of the problems with the related art and provides: a ceria-zirconia-based composite oxide that is endowed with both a sufficiently good oxygen storage capacity and a sufficiently high heat resistance, and thus is able to exhibit a sufficiently good oxygen storage capacity even after long-term exposure to elevated temperatures; a method for producing such a composite oxide; and an exhaust gas purification catalyst that includes such a ceria-zirconia-based composite oxide.

The inventors have conducted extensive investigations in order to attain the above objects, as a result of which they have discovered that by using, as a ceria-zirconia-based composite oxide, a composite oxide of ceria and zirconia that satisfies the specific conditions of having a relative content of cerium and zirconium within a specific ratio and having a high content of particles of a relatively large particle diameter as primary particles, the resulting ceria-zirconia-based composite oxide achieves both a sufficiently good oxygen storage capacity and a sufficiently good heat resistance at a high level and, even after long-term exposure to elevated temperatures, is able to exhibit a sufficiently good oxygen storage capacity.

The inventors have also found that, surprisingly, by setting the content ratio of cerium to zirconium ([cerium]:[zirconium]) within a ceria-zirconia-based solid solution powder in the range of 43:57 to 55:45 by mole ratio, press-molding this ceria-zirconia-based solid solution powder under a given high pressure and subsequently carrying out reducing treatment in two stages under given temperature conditions, the oxygen storage capacity and heat resistance of the resulting ceria-zirconia-based composite oxide are both achieved at a high level and, even after long-term exposure to elevated temperatures, the ceria-zirconia-based composite oxide is able to exhibit a sufficiently good oxygen storage capacity.

According to one aspect of the invention, a ceria-zirconia-based composite oxide includes a composite oxide containing ceria and zirconia, wherein primary particles having a particle diameter of 1.5 to 4.5 µm in the ceria-zirconia-based composite oxide account for, on a particle number basis, at least 50% of all primary particles in the composite oxide, and a content ratio of cerium to zirconium ([cerium]:[zirconium]) in the ceria-zirconia-based composite oxide is in a range of 43:57 to 55:45 by mole ratio; and when heated for 5 hours in the atmosphere under a temperature condition of 1,100° C. and thereafter examined by X-ray diffractometry using CuKα, the ceria-zirconia-based composite oxide exhibits an X-ray diffraction pattern in which an intensity ratio of diffraction line at a 2θ of 14.5° to diffraction line at a 2θ of 29° {I(14/29) value} and an intensity ratio of diffraction line at a 2θ of 28.5° to diffraction line at a 2θ of 29° {I(28/29) value} satisfy requirement I(14/29)≥0.015 and I(28/29)≤0.08.

A method for producing the ceria-zirconia-based composite oxide that includes a composite oxide containing ceria and zirconia according to the one aspect of the invention includes: providing a ceria-zirconia-based solid solution powder having a content ratio of cerium to zirconium ([cerium]:[zirconium]) in a range of 43:57 to 55:45 by mole ratio; press-molding the ceria-zirconia-based solid solution powder under a pressure of 1,500 to 3,500 kgf/cm$^2$; subjecting a ceria-zirconia-based solid solution powder compact to a first reducing treatment that entails 0.5 to 24 hours of heat treatment under reducing conditions at a temperature between 1,400 and 1,550° C.; and subjecting the first reduction-treated ceria-zirconia-based solid solution powder compact to a second reducing treatment that entails 0.5 to 5 hours of heat treatment under reducing conditions at a temperature which is between 1,600 and 2,000° C. and at least 100° C. higher than the temperature in the first reducing treatment so as to obtain the ceria-zirconia-based composite oxide according to one aspect of the invention.

An exhaust gas purification catalyst may include the foregoing ceria-zirconia-based composite.

In the above ceria-zirconia-based composite oxide, primary particles having a particle diameter of less than 1.5 μm may be made to account for, on a particle number basis, not more than 40% of all primary particles in the composite oxide.

In the above ceria-zirconia-based composite oxide, primary particles having a particle diameter of less than 1.5 μm may be made to account for, on a particle number basis, not more than 20% of all primary particles in the composite oxide.

In the above ceria-zirconia-based composite oxide, primary particles having a particle diameter of less than 1.5 μm may be made to account for, on a particle number basis, not more than 10% of all primary particles in the composite oxide.

In the above ceria-zirconia-based composite oxide, primary particles having a particle diameter of 1.5 to 4.5 μm may be made to account for, on a particle number basis, at least 70% of all primary particles in the composite oxide.

In the above ceria-zirconia-based composite oxide, primary particles having a particle diameter of 1.5 to 4.5 μm may be made to account for, on a particle number basis, at least 80% of all primary particles in the composite oxide.

The above method for producing a ceria-zirconia-based composite oxide may further include, following the second reducing treatment, subjecting the ceria-zirconia-based composite oxide to oxidizing treatment.

The I(14/29) and I(28/29) values in the one aspect of the invention are respectively the intensity ratio between the diffraction line at 2θ=14.5° and the diffraction line at 2θ=29° and the intensity ratio between the diffraction line at 2θ=28.5° and the diffraction line at 2θ=29° determined from an x-ray diffraction pattern using the CuKα line obtained by x-ray diffractometry after heating the ceria-zirconia-based composite oxide for 5 hours in the atmosphere at 1,100° C. x-ray diffractometry may be carried out by measurement with an x-ray diffractometer (RINT 2100, Rigaku Corporation) using the CuKα line under the following conditions: 40 kV, 30 mA, 2θ=2°/min.

Here, the diffraction line at 2θ=14.5° is a diffraction line attributable to the (111) plane of the ordered phase (κ phase), and the diffraction line at 2θ=29° is where the diffraction line attributable to the (222) plane of the ordered phase and the diffraction line attributable to the (0.111) plane of the cubic phase of a ceria-zirconia solid solution (CZ solid solution) overlap. Hence, by calculating the intensity ratio between the two diffraction lines, referred to herein as the I(14/29) value, an indicator of the percent retention (abundance) of the ordered phase is obtained. When the diffraction line intensities are determined, the average diffraction line intensity for the 2θ range of 10° to 12° is subtracted as a background value from each diffraction line intensity. Incidentally, completely ordered phases include the κ phase ($Ce_2Zr_2O_8$) in which all the oxygen sites are occupied and the pyrochlore phase ($Ce_2Zr_2O_7$) in which all the oxygen sites are vacant; the I(14/29) value for the κ phase and the I(14/29) value for the pyrochlore phase which were calculated from the corresponding pair distribution function (PDF) cards (PDF-2: 01-070-4048 for the κ phase and PDF-2: 01-075-2694 for the pyrochlore phase) are 0.04 and 0.05, respectively. The crystalline phase having an ordered phase, that is, an ordered array configured of cerium ions and zirconium ions, is an array of crystals having peaks at 2θ angles of 14.5°, 28°, 37°, 44.5° and 51° (φ' phase (the same phase as κ phase) type ordered array phase: a superlattice structure occurring in a fluorite structure) in the x-ray diffraction pattern using the CuKα line obtained by x-ray diffractometry. Here, "peak" refers to a feature having a height of at least 30 cps from the base line to the peak top.

The diffraction line at 2θ=28.5° is a diffraction line attributable to the (111) plane of $CeO_2$ alone. By calculating the I(28/29) value, which is the intensity ratio between the diffraction line at 2θ=28.5° and the diffraction line at 2θ=29°, an indicator of the degree to which $CeO_2$ is present as a separate phase in the composite oxide is obtained.

Although it is not entirely clear why the above objects are attained with ceria-zirconia-based composite oxides obtained by the production method according to the one aspect of the invention, the inventors believe the reasons to be as follows. First of all, in one aspect of the invention, by having primary particles with a particle diameter of 1.5 to 4.5 μm in the ceria-zirconia-based composite oxide account for, on a particle number basis, at least 50% of all the primary particles, the proportion of primary particles having a relatively large particle diameter can be made high and a uniform particle size distribution is obtained while at the same time suppressing an increase in the surface area. It is presumed, for example, that even with exposure to a high-temperature oxidizing atmosphere, phase transformation from the pyrochlore phase (an ordered phase) to a cubic phase (fluorite structure) can be suppressed, enabling a decrease in the oxygen storage capacity (OSC) to be suppressed. Moreover, the inventors believe that, because the content ratio of cerium to zirconium in the composite oxide ([cerium]:[zirconium]) is in the range of 43:57 to 55:45 by mole ratio, the composite oxide stability-enhancing effect achieved by suppressing the phase separation of ceria exceeds the decrease in oxygen storage capacity owing to the above-described zirconium-rich composition, as a result of which the composite oxide has an increased heat resistance and, even after long-term exposure to elevated temperatures, exhibits a sufficiently good oxygen storage capacity.

Also, in one aspect of the invention, a ceria-zirconia-based solid solution powder in which the content ratio of cerium to zirconium ([cerium]:[zirconium]) is in the range of 43:57 to 55:45 by mole ratio is press-molded at a pressure of 1,500 to 3,500 kgf/cm$^2$, and subsequently subjected to a first reducing treatment which entails from 0.5 to 24 hours of heat treatment under reducing conditions at a temperature between 1,400 and 1,550° C. followed by a second reducing treatment which entails from 0.5 to 5 hours of heat treatment under reducing conditions at a temperature that is between 1,600 and 2,000° C. and at least 100° C. higher than in the first reducing treatment. By thus press-molding the unreduced composite oxide at a given high pressure, grain boundaries within the powder are controlled and contact between the particles increases, more easily promoting crystal growth during reducing treatment and at the same time making rearrangement of the ions easier, in this way facilitating formation of an ordered phase. Moreover, because the particles are tightly packed, the probability of contact between particles becomes relatively uniform and the degree of progression in grain growth is uniform, resulting in greater stability as crystals. Hence, by subjecting a composite oxide that has been pressed in this way at a given pressure to reducing treatment under predetermined temperature and time conditions, the inventors believe that excessive grain growth and crystal phase transition by particles in a high-temperature durability test thereafter are fully suppressed, providing a composite oxide stability-enhancing effect because the phase separation of ceria mentioned above is suppressed and also, as a result, maintaining a high oxygen storage capacity even upon long-term exposure to elevated temperatures. Also, it appears that by subjecting the press-molded ceria-zirconia-based solid solution powder compact to two-stage reducing treatment at higher treatment temperatures, the proportion of primary particles present in the ceria-zirconia-based composite oxide that have a relatively large particle diameter can be increased, giving a composite oxide having a uniform particle size distribution while suppressing an increase in surface area, which in turn presumably enables phase transformation from the pyrochlore phase (ordered phase) to a cubic phase (fluorite structure) to be suppressed even when the composite oxide has been exposed to a high-temperature oxidizing atmosphere, and makes it possible to suppress a decrease in oxygen storage capacity. Additionally, the inventors surmise that carrying out reducing treatment in two stages at specific temperatures and for specific lengths of time has the following effects: first, the first reducing treatment enables an ordered phase to be effectively formed while suppressing the phase separation of ceria; next, the second reducing treatment enables grain growth of the primary particles to be promoted, thus endowing the composite oxide with both a sufficiently good oxygen storage capacity (OSC) and a sufficiently high heat resistance, and enabling the composite oxide to exhibit a sufficiently good oxygen storage capacity (OSC) even after long-term exposure to elevated temperatures.

The above aspects of the invention thus make it possible to provide a ceria-zirconia-based composite oxide that is endowed with both a sufficiently good oxygen storage capacity (OSC) and a sufficiently high heat resistance and that is able to exhibit a sufficiently good oxygen storage capacity (OSC) even after long-term exposure to elevated temperatures, a method for producing such a composite oxide, and an exhaust gas purification catalyst which includes this ceria-zirconia-based composite oxide.

BRIEF DESCRIPTION OF THE DRAWING

Features, advantages, and the technical and industrial significance of exemplary embodiments of the invention will be described below with reference to the accompanying drawings, in which like numerals denote like elements, and wherein:

FIG. 1 is a table which shows the Ce/Zr ratios, the pressure applied in the press-molding step, reducing treatment temperatures and times, ceria-zirconia-based composite oxide particle size distributions, I(14/29) values, I(28/29) values and oxygen storage capacity for Examples 1 to 8 and Comparative Examples 1 to 6.

DETAILED DESCRIPTION OF EMBODIMENTS

The invention is described more fully below with reference to preferred embodiments thereof.

First, the ceria-zirconia-based composite oxide according to an example of the invention is described. The ceria-zirconia-based composite oxide according to the example of the invention is a ceria-zirconium-based composite oxide which includes a composite oxide containing ceria and zirconia. Primary particles having a particle diameter of 1.5 to 4.5 μm in the ceria-zirconia-based composite oxide account for, on a particle number basis, at least 50% of all primary particles in the composite oxide, and the content ratio of cerium to zirconium ([cerium]:[zirconium]) in the ceria-zirconia-based composite oxide is in the range of 43:57 to 55:45 by mole ratio. When heated for 5 hours in the atmosphere under a temperature condition of 1,100° C. and thereafter examined by X-ray diffractometry using CuKα, the ceria-zirconia-based composite oxide exhibits an X-ray diffraction pattern in which an intensity ratio of diffraction line at a 2θ of 14.5° to diffraction line at a 2θ of 29° {I(14/29) value} and an intensity ratio of diffraction line at a 2θ of 28.5° to diffraction line at a 2θ of 29° {I(28/29) value} satisfy requirement I(14/29)≥0.015 and I(28/29)≤0.08.

In the ceria-zirconia-based composite oxide of the example of the invention, it is critical for primary particles having a particle diameter of 1.5 to 4.5 μm in the ceria-zirconia-based composite oxide to account for, on a particle number basis, at least 50% of all primary particles in the composite oxide. At a content of primary particles in the above size range below 50%, it is not possible to have a high proportion of primary particles be primary particles of a relatively large particle diameter. For example, when the composite oxide has been exposed to a high-temperature oxidizing atmosphere, a sufficient phase transformation-suppressing effect from the pyrochlore phase (ordered phase) to the cubic phase (fluorite structure) is not obtained, and the oxygen storage capacity decrease-suppressing effect tends to be inadequate. The particle size distribution of primary particles of the ceria-zirconia-based composite oxide is an average value obtained by using a scanning electron microscopic (SEM) to randomly examine cross-sections of CZ composite oxide particles at two or more places, then determining, on a number basis, crystal grain diameters within each visual field obtained and estimating the distribution thereof. In cases where the cross-section is not circular, "crystal grain size" refers herein to the diameter of the smallest circumscribed circle around the crystal grain.

The primary particles having a particle diameter of 1.5 to 4.5 μm in the above ceria-zirconia-based composite oxide more preferably account for, on a particle number basis, at least 70% of all primary particles in the composite oxide. This reduces the proportion of the particle surfaces exposed to a high-temperature oxidizing atmosphere, so that the proportion of phase transformations by the ordered phase tends to decrease.

It is especially preferable for the primary particles having a particle diameter of 1.5 to 4.5 µm in the above ceria-zirconia-based composite oxide to account for, on a particle number basis, at least 80% of all primary particles in the composite oxide. This further reduces the proportion of the particle surfaces that is exposed, so that the proportion of phase transformations tends to decline.

In the ceria-zirconia-based composite oxide according to the example of the invention, primary particles having a particle diameter of less than 1.5 µm in the ceria-zirconia-based composite oxide account for, on a particle number basis, preferably not more than 40%, more preferably not more than 20%, and most preferably not more than 10%, of all primary particles in the composite oxide. If the content of primary particles in this particle diameter range exceeds the above limit, the surface area of the particles increases. As a result, on exposure to a high-temperature oxidizing atmosphere, for example, the suppression of phase transformations from the pyrochlore phase (ordered phase) to the cubic phase (fluorite structure) is inadequate and the oxygen storage capacity (OSC) decrease-suppressing effect tends to be inadequate.

The ceria-zirconia-based composite oxide according to the example of the invention has a content ratio of cerium to zirconium ([cerium]:[zirconium]) which must be in the range of 43:57 and 55:45 by mole ratio, is preferably in the range of 43:57 to 48:52, and is most preferably in the range of 44:56 to 47:53. When the cerium content is below the above lower limit, the decrease in the oxygen storage capacity due to the zirconium-rich composition exceeds the composite oxide stability-enhancing effect due to the suppression of phase separation by ceria, as a result of which the oxygen storage capacity following a high-temperature durability test becomes insufficient. On the other hand, when the cerium content exceeds the above upper limit, a composite oxide stability-enhancing effect due to the suppression of phase separation by ceria is not obtained, and so the oxygen storage capacity following a high-temperature durability test is inadequate.

In addition, the ceria-zirconia-based composite oxide according to the example of the invention must have an I(14/29) value of at least 0.015, preferably at least 0.030, and most preferably at least 0.032. If this I(14/29) value is below the above lower limit, the percentage of retention of ordered phase is low and the oxygen storage capacity following a high-temperature durability test is inadequate. Although the I(14/29) value has no particular upper limit, given that the I(14/29) value of the pyrochlore phase calculated from the PDF card (01-075-2694) is the upper limit, this is preferably not more than 0.05.

Also, the ceria-zirconia-based composite oxide according to the example of the invention must have an I(28/29) value of 0.08 or less, preferably 0.06 or less, and most preferably 0.04 or less. If this I(28/29) value exceeds the above upper limit, ceria phase separation is not sufficiently suppressed and the oxygen storage capacity following a high-temperature durability test is inadequate. Although the I(28/29) value has no particular lower limit, a smaller value is more preferred.

In the ceria-zirconia-based composite oxide according to the example of the invention, a crystalline phase (ordered phase, pyrochlore phase) having an ordered array structure is formed of the cerium ions and zirconium ions in the composite oxide. Because such an ordered phase has been formed, the heat resistance to elevated temperatures rises and a sufficiently high oxygen storage capacity is exhibited even following exposure to elevated temperatures. Moreover, in the ceria-zirconia-based composite oxide according to the example of the invention, the content of this ordered phase relative to the overall crystalline phase, as determined from the peak intensity ratios in the above-described x-ray diffraction pattern, is preferably from 50 to 100%, and more preferably from 80 to 100%. If the content of ordered phase is below the above-indicated lower limit, the oxygen storage material deterioration-suppressing effects and heat resistance of the composite oxide have a tendency to decrease.

The ceria-zirconia-based composite oxide according to the example of the invention may also include at least one element selected from the group consisting of rare-earth elements other than cerium and alkaline earth elements. By including such an element, in cases where the inventive ceria-zirconia-based composite oxide is used as a support for an exhaust gas purification catalyst, a higher exhaust gas purifying ability tends to be exhibited. Examples of such rare-earth elements other than cerium include scandium (Sc), yttrium (Y), lanthanum (La), praseodymium (Pr), neodymium (Nd), samarium (Sm), gadolinium (Gd), terbium (Tb), dysprosium (Dy), ytterbium (Yb) and lutetium (Lu). Of these, when a precious metal has been supported on the inventive ceria-zirconia-based composite oxide, given the tendency for interactions with the precious metal to become stronger and for the affinity to increase, La, Nd, Pr, Y and Sc are preferred, with La, Y and Nd being more preferred. Examples of alkaline earth metal elements include magnesium (Mg), calcium (Ca), strontium (Sr), barium (Ba) and radium (Ra). Of these, when a precious metal has been supported on the inventive ceria-zirconia-based composite oxide, given the tendency for interactions with the precious metal to become stronger and for the affinity to increase when a precious metal has been supported, Mg, Ca and Ba are preferred. Because such rare-earth elements other than cerium and alkaline earth metal elements, all of which have low electronegativities, strongly interact with precious metals, these elements tend to bond with precious metals through oxygen in an oxidizing atmosphere, thereby suppressing evaporation and sintering of the precious metal and enabling deterioration of the precious metal that makes up the active sites during exhaust gas purification to be fully suppressed.

When at least one element selected from the group consisting of rare-earth elements other than cerium and alkaline earth elements is also included, the content of such elements is preferably from 1 to 20 mass %, and more preferably from 3 to 7 mass %, of the ceria-zirconia-based composite oxide. If the content of such elements is below this lower limit, when a precious metal is supported on the resulting composite oxide, fully enhancing interactions with the precious metal tends to be difficult. On the other hand, if the content exceeds the upper limit, the oxygen storage capacity tends to decline.

The ceria-zirconia-based composite oxide as thus explained has a specific surface area which, although not subject to any particular limitation, is preferably from 0.01 to 20 m$^2$/g, and more preferably from 0.05 to 10 m$^2$/g. If the specific surface area is below this lower limit, interactions with the precious metal become small and the oxygen storage capacity tends to become small. On the other hand, if the specific surface area exceeds this upper limit, there is a tendency for the number of particles having a small particle diameter to increase and for the heat resistance to decrease. Such a specific surface area can be calculated from an adsorption isotherm as the BET specific surface area using the BET isotherm adsorption equation.

Next, an example of a method for producing the ceria-zirconia-based composite oxide according to the example of the invention is described.

The method for producing the ceria-zirconia-based composite oxide according to the example of the invention is a method for producing a ceria-zirconia-based composite oxide that includes a composite oxide of ceria and zirconia, this method including: providing a ceria-zirconia-based solid solution powder having a content ratio of cerium to zirconium ([cerium]:[zirconium]) in the range of 43:57 to 55:45 by mole ratio; press-molding the ceria-zirconia-based solid solution powder under a pressure of 1,500 to 3,500 kgf/cm$^2$; subjecting a ceria-zirconia-based solid solution powder compact to a first reducing treatment including 0.5 to 24 hours of heat treatment under reducing conditions at a temperature between 1,400 and 1,550° C.; and subjecting the first reduction-treated ceria-zirconia-based solid solution powder compact to a second reducing treatment including 0.5 to 5 hours of heat treatment under reducing conditions at a temperature which is between 1,600 and 2,000° C. and at least 100° C. higher than the temperature in the first reducing treatment.

The ceria-zirconia-based solid solution powder according to the invention (a solid solution powder containing ceria and zirconia) has a content ratio of cerium to zirconium ([cerium]:[zirconium]) which must be in the range of 43:57 to 55:45 by mole ratio, and is preferably in the range of 43:57 to 48:52, and most preferably in the range of 44:56 to 47:53. If the cerium content in the ceria-zirconia-based solid solution powder used is below the above lower limit, the decrease in the oxygen storage capacity due to the zirconium-rich composition is greater than the composite oxide stability-enhancing effect due to the suppression of phase separation by ceria, resulting in an insufficient oxygen storage capacity following a high-temperature durability test. On the other hand, if the cerium content exceeds the above upper limit, a composite oxide stability-enhancing effect due to the suppression of phase separation by ceria is not obtained, resulting in an insufficient oxygen storage capacity after a high-temperature curability test.

To enable the sufficient formation of ordered phase, it is preferable to use as this ceria-zirconia-based solid solution powder a solid solution in which ceria and zirconia have been mixed at the atomic level. Such a ceria-zirconia-based solid solution powder has an average primary particle diameter of preferably from about 5 to about 50 nm. If the average primary particle diameter of the ceria-zirconia-based solid solution powder is below the above lower limit, the formation of a solid solution of ceria and zirconia in the powder does not fully proceed, as a result of which an ordered phase tends to be difficult to obtain. On the other hand, if the average primary particle diameter of the ceria-zirconia-based solid solution powder exceeds the above limit, the state of contact among primary particles during press-molding worsens and grain growth during reducing treatment tends to be inadequate.

The method for producing such a ceria-zirconia-based solid solution powder is not particularly limited and may be illustrated by, for example, a method for producing the solid solution powder by employing a co-precipitation process to set the content ratio of cerium to zirconium within the above-indicated range. The co-precipitation process is exemplified by a process in which an aqueous solution containing a salt of cerium (e.g., a nitrate salt) and a salt of zirconium (e.g., a nitrate salt) is used to form a co-precipitate in the presence of ammonia, the resulting co-precipitate is filtered and washed, then dried, and is moreover fired, then ground using a grinding machine such as a ball mill to give the ceria-zirconia-based solid solution powder. The aqueous solution containing at least one type of salt selected from the group consisting of salts of cerium and salts of zirconium is prepared in such a way that the cerium and zirconium contents in the resulting solid solution powder fall within given ranges. Salts of at least one element selected from the group consisting of rare-earth elements and alkaline earth elements, surfactants (e.g., nonionic surfactants) and other ingredients may be optionally added to such an aqueous solution.

Next, the individual steps are described. In this invention, first a press-molding step is carried out wherein the ceria-zirconia-based solid solution powder is press-molded at a pressure of from 1,500 to 3,500 kgf/cm$^2$ (and preferably a pressure of 1,750 to 3,000 kgf/cm$^2$). If the pressure in this press-molding step is below this lower limit, the packing density of the powder does not adequately increase and so crystal growth during reducing treatment fails to fully proceed, as a result of which the oxygen storage capacity following a high-temperature durability test in the resulting ceria-zirconia-based composite oxide is inadequate. On the other hand, if the pressure in the press-molding step exceeds the above limit, phase separation of the ceria readily proceeds, as a result of which the oxygen storage capacity following a high-temperature durability test in the resulting ceria-zirconia-based composite oxide is inadequate. No particular limitation is imposed on such a press-molding method, although suitable use can be made of a conventional press-molding method such as isostatic pressing.

Next, in this invention, a first reducing treatment step is carried out in which the ceria-zirconia-based solid solution powder compact formed in the press-molding step is subjected to a first reducing treatment that entails heat treatment under reducing conditions at a temperature of from 1,400 to 1,550° C. (preferably 1,450 to 1,550° C.) for 0.5 to 24 hours (preferably 1 to 10 hours). If the temperature of this first reducing treatment is below the above lower limit, the stability of the ordered phase is low, as a result of which the oxygen storage capacity following high-temperature durability testing in the resulting ceria-zirconia-based composite oxide is inadequate. On the other hand, if this first reducing treatment temperature exceeds the above upper limit, phase separation of the ceria readily arises, as a result of which the oxygen storage capacity tends to decrease. If the heating time during this first reducing treatment is below the lower limit, formation of the ordered phase tends to be inadequate. On the other hand, if it exceeds the above upper limit, phase separation of the ceria tends to readily arise.

No particular limitation is imposed on the first reduction treatment method, provided that the solid solution powder can be heat-treated under a reducing atmosphere and given temperature conditions. Illustrative examples of suitable methods include: (i) the method of placing the solid solution powder in a vacuum heating furnace, evacuating the furnace, then introducing a reducing gas into the furnace to change the atmosphere within the furnace to a reducing atmosphere, and heating the power under given temperature conditions to effect reducing treatment; (ii) the method of using a furnace made of graphite, placing the solid solution powder in the furnace, evacuating the furnace, then heating the furnace to given temperature conditions so as to cause the furnace body, heated fuel and the like to generate reducing gases such as carbon monoxide (CO) and hydrocarbons (HC), thereby changing the atmosphere within the furnace to a reducing atmosphere and effecting reducing treatment; and (iii) the method of placing the solid solution powder in a crucible filled with activated carbon (C) and heating under given temperature conditions to cause the activated C and the like to generate reducing gases such as CO and HC, thereby changing the atmosphere inside the crucible to a reducing atmosphere and effecting reducing treatment.

The reducing gas used to achieve such as a reducing atmosphere is not particularly limited, although reducing gases such as CO, HC, $H_2$ and other hydrocarbon gases may be suitably used. Of these reducing gases, to prevent the formation of by-products such as zirconium carbide (ZrC) during reducing treatment at more elevated temperatures, the use of a reducing gas which does not contain C is preferred. In cases where such a reducing gas containing no C is used, because reducing treatment under higher temperature conditions close to the melting point of zirconium is possible, the structural stability of the crystalline phase can be adequately enhanced.

Next, the ceria-zirconia-based solid solution powder compact that has incurred a first reducing treatment is then subjected to a second reducing treatment step in which a second reducing treatment is carried out that entails heating treatment under reducing conditions at a temperature of from 1,600 to 2,000° C. which is at least 100° C. higher than the temperature in the first reducing treatment (preferably a temperature of from 1,650 to 1,750° C. that is at least 150° C. higher than the temperature in the first reducing treatment) for a period of from 0.5 to 5 hours (preferably 1 to 4 hours), the ceria-zirconia-based composite oxide according to the example of the invention is obtained. When the temperature in the second reducing treatment is below the above lower limit, grain growth tends to be inadequate. On the other hand, when the temperature of the second reducing treatment exceeds the above upper limit, the balance between the energy (e.g., electrical power) required for reducing treatment and the increase in performance worsens. Also, if the difference between the temperature of the second reducing treatment and the temperature of the first reducing treatment is less than 100° C., it tends to become difficult to induce grain growth while adequately suppressing phase separation of the ceria. In addition, when the heating time during the second reducing treatment is below the lower limit, grain growth has a tendency to become inadequate. On the other hand, when the heating time exceeds the above upper limit, grain growth proceeds to a sufficient degree and further operations become unnecessary, which tends to result in a decline in cost-effectiveness.

The second reducing treatment method and the reducing gases used to achieve a reducing atmosphere therein may be the same reducing treatment method and reducing gas as are used in the first reducing treatment.

In the practice of this invention, following the second reducing treatment step, it is preferable to additionally carry out oxidation treatment on the ceria-zirconia-based composite oxide (oxidation treatment step). By carrying out such oxidation treatment, oxygen lost during reduction is compensated in the resulting ceria-zirconia-based composite oxide and the stability as an oxide powder tends to increase.

No particular limitation is imposed on the method used for such oxidation treatment, although preferred use can be made of the method of heat-treating the ceria-zirconia-based composite oxide in an oxidizing atmosphere (e.g., in the atmosphere). The heating temperature conditions in such oxidation treatment are not particularly limited, although a temperature of from about 300 to about 800° C. is preferred. In addition, the heating time during such oxidation treatment is not particularly limited, although a heating time of from about 0.5 to about 5 hours is preferred.

In the practice of this invention, following the second reducing treatment step or the oxidizing treatment step, it is preferable to additionally carry out grinding treatment on the ceria-zirconia-based composite oxide (grinding step). By carrying out such grinding treatment, handling of the resulting ceria-zirconia-based composite oxide when it is coated onto, for example, a cordierite honeycomb, tends to become easier.

The method employed for such grinding treatment is not particularly limited, although preferred use may be made of, for example, wet grinding, dry grinding or freeze-grinding.

By thus carrying out the method of producing a ceria-zirconia-based composite oxide according to the example of the invention, it is possible to obtain a ceria-zirconia-based composite oxide according to the invention which simultaneously satisfies the following three conditions: (1) primary particles having a particle diameter of 1.5 to 4.5 μm in the ceria-zirconia-based composite oxide account for, on a particle number basis, at least 50% of all primary particles in the composite oxide; (2) the I(28/29) value is ≥0.015; and (3) the I(28/29) value is ≤0.08.

To obtain a ceria-zirconia-based composite oxide according to the example of the invention in which primary particles having a particle diameter of 1.5 to 4.5 μm in the ceria-zirconia-based composite oxide account for, on a particle number basis, at least 70% of all primary particles in the composite oxide, it is preferable for the pressure applied in the press-molding step to be from 1,750 to 3,000 $kgf/cm^2$, for the first reducing treatment to be carried out at a temperature of between 1,450 and 1,550° C. for a period of 1 to 10 hours, for the second reducing treatment to be carried out at a temperature of between 1,650 and 1,750° C. for a period of 1 to 4 hours, and for the difference between the first reducing treatment temperature and the second reducing treatment temperature to be at least 150° C.

The ceria-zirconia-based composite oxide and method for producing such a composite oxide according to the example of the invention have been described above. The inventive exhaust gas purification catalyst using such a ceria-zirconia-based composite oxide is similarly described below.

The exhaust gas purification catalyst according to the example of the invention includes the ceria-zirconia-based composite oxide according to the example of the invention described above. This exhaust gas purification catalyst according to the example of the invention possesses both a sufficiently good oxygen storage capacity (OSC) and a sufficiently high heat resistance, and moreover exhibits a sufficiently good oxygen storage capacity even after long-term exposure to elevated temperatures.

Preferred examples of the exhaust gas purification catalyst according to the invention include exhaust gas purification catalysts which include a support containing the ceria-zirconia-based composite oxide of the invention and a precious metal supported on the support. Illustrative examples of such precious metals include platinum, rhodium, palladium, osmium, iridium, gold and silver. The method for supporting the precious metal on such a support is not particularly limited. Suitable use may be made of a conventional method, such as one that entails immersing a powder of the ceria-zirconia-based composite oxide (support) in a solution composed of a precious metal salt (e.g., nitrate, hydrochloride, acetate) or precious metal complex dissolved in a solvent such as water or alcohol, removing the solvent, and subsequently firing. The amount of precious metal supported on the support is not particularly limited, so long as a necessary and appropriate amount for such considerations as the intended design of the catalyst is supported, although setting the amount to at least 0.01 mass % is preferred.

Another preferred example of an exhaust gas purification catalyst according to the invention is an exhaust gas purification catalyst made up of a first catalyst composed of catalyst-supporting fine particles and a precious metal supported on the catalyst-supporting fine particles, the ceria-zirconia-based composite oxide according to example of the invention is arranged about the first catalyst. No particular limitation is imposed on such catalyst-supporting fine particles; suitable use can be made of a carrier composed of a metal oxide or metal oxide composite that is capable of being used as the support for an exhaust gas purification catalyst (e.g., alumina particles, particles composed of alumina/ceria, and particles composed of alumina/ceria/zirconia). The above-described method may be employed as the method for supporting a precious metal on such catalyst-supporting fine particles. The amount of precious metal supported on the catalyst-supporting fine particles is not particularly limited, so long as a necessary and appropriate amount for such considerations as the intended design of the catalyst is supported, although setting the amount to at least 0.01 mass % is preferred. Also, the method of arranging the ceria-zirconia-based composite oxide according to the example of the invention about this first catalyst is not particularly limited; for example, a method that entails mixing together the first catalyst and the ceria-zirconia-based composite oxide according to the example of the invention may be employed. In addition, from the standpoint of obtaining a higher catalyst activity, it is preferable for the ceria-zirconia-based composite oxide according to the example of the invention to be arranged about the first catalyst in a highly dispersed state.

The invention is illustrated more concretely below by way of working examples and comparative examples, although the invention is not to be construed as being limited by these examples.

Example 1

A ceria-zirconia-based solid solution powder having a content ratio of cerium to zirconium ([cerium]:[zirconium]) of 45:55 by mole ratio was prepared as described below. First, 442 g of a 28 mass % ($CeO_2$ basis) aqueous cerium nitrate solution, 601 g of an 18 mass % ($ZrO_2$ basis) aqueous zirconium oxynitrate solution, and 200 g of an aqueous solution containing 1.1 moles of hydrogen peroxide per mole of cerium included were added to 1,220 g of an aqueous solution containing 1.2 equivalents of ammonia per neutralization equivalent, thereby forming a co-precipitate. The resulting co-precipitate was centrifugally separated and washed (ion-exchanged water). Next, the co-precipitate was dried in the atmosphere at 110° C. for at least 10 hours and then fired in the atmosphere at 400° C. for 5 hours, giving a solid solution of cerium and zirconium ($CeO_2$—$ZrO_2$ solid solution). The solid solution was then ground to a particle diameter of not greater than 75 μm on a sieve using a grinding mill (available from AS ONE Corporation under the trade name "Wonder Blender"), giving a ceria-zirconia-based solid solution powder.

Twenty grams of the resulting ceria-zirconia-based solid solution powder was then packed into a polyethylene bag (volume, 0.05 L) and the interior was degassed, following which the mouth of the bag was heated and sealed. Next, using an isostatic press (available under the trade name "CK4-22-60" from NIKKISO CO., LTD.), cold isostatic pressing (CIP) was carried out on the bag for 1 minute at a pressure (pressure applied in pressing step) of 1,500 kgf/$cm^2$, giving a ceria-zirconia-based solid solution powder compact. The size of the compact was set to a length of 4 cm, a width of 4 cm, an average thickness of 7 mm, and a weight of about 20 g.

The resulting compacts (2 sheets) were then set within a crucible (internal volume: diameter, 8 cm; height, 7 cm) filled with 70 g of activated carbon and a lid was placed on the crucible, following which the crucible was placed in a high-speed heating electric furnace and heated to 1,000° C. over a temperature ramp-up time of 1 hour, then heated to 1,400° C. (first reducing treatment temperature) over a ramp-up time of 2 hours and held at that temperature for 3 hours, next heated to 1,600° C. (second reducing treatment temperature) over a ramp-up time of 2 hours and held at that temperature for 2 hours, after which the crucible was cooled to 1,000° C. over a cooling time of 4 hours, then allowed to cool down gradually to room temperature, thereby giving a reduction-treated product.

This reduction-treated product was then oxidized by 5 hours of heating at 500° C. in the atmosphere, giving a ceria-zirconia-based composite oxide having a molar ratio of cerium to zirconium ([cerium]:[zirconium]) in the composite oxide of 45:55. This ceria-zirconia-based composite oxide was ground to a particle size of not more than 75 μm on a sieve.

<Particle Size Distribution Measurement Test>

The particle size distribution of primary particles of the resulting ceria-zirconia-based composite oxide was measured as follows. This is an average value obtained by using a scanning electron microscope (available under the trade name "JSM-7000F" from JEOL Ltd.) to randomly examine cross-sections of ceria-zirconia-based composite oxide particles at two or more places, then determining, on a number basis, crystal grain diameters within each visual field (240 μm×240 μm at a magnification of 500×) obtained and estimating the distribution thereof. In cases where the cross-section is not circular, "crystal grain size" refers to the diameter of the smallest circumscribed circle around the crystal grain. The results thus obtained are shown in Table 1 (FIG. 1).

<X-Ray Diffractometry (XRD) Measurement>

The ceria-zirconia-based composite oxide was heat-treated in the atmosphere at 1,100° C. for 5 hours (high-temperature durability test), and the crystalline phase of the ceria-zirconia-based composite oxide following treatment was measured by x-ray diffractometry. The x-ray diffraction pattern was measured with an x-ray diffractometer (available under the trade name "RINT-2100" from Rigaku Corporation) and the I(14/29) and I(28/29) values were measured. The results are shown in Table 1 (FIG. 1).

<Measurement of Oxygen Storage Capacity: Oxygen Storage Capacity Assessment>

One gram of ceria-zirconia-based composite oxide powder following the above durability test and 1 g of a Pd/$Al_2O_3$ catalyst that includes supported Pd (0.25 wt %) were physically mixed in a mortar, after which the mixture was press-molded into a compact and then ground, giving an exhaust gas purification catalyst in the form of pellets having a diameter of 0.5 mm to 1 mm.

Next, 0.5 g of the resulting catalyst was filled into a quartz reaction tube (internal volume: diameter, 1.7 cm; length, 9.5 cm) and, in a fixed-bed flow reactor, a rich gas (CO (2 vol %)+$N_2$ (balance)) and a lean gas ($O_2$ (1 vol %)+$N_2$ (balance)) were alternately passed through by switching therebetween every 3 minutes, and the oxygen storage capacity (OSC) was determined from the amount of $CO_2$ that forms in the rich gas atmosphere. The gas flow rate was set to 10 L/min, and the measurement temperature was set to 600° C. The instrument used was the exhaust gas analyzer available under the trade name "Bex-5900Csp" from BEST INSTRUMENTS CO., Ltd. The results are shown in Table 1 (FIG. 1).

Example 2

Aside from changing the pressure applied in the press-molding step to 2,000 kgf/cm$^2$, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Example 3

Aside from setting the pressure applied in the press-molding step to 2,000 kgf/cm$^2$, setting the reducing treatment conditions in the first reducing treatment to a ramp-up time of 3 hours, a reducing treatment temperature of 1,500° C. and a holding time of 3 hours, and setting the reducing treatment conditions in the second reducing treatment to a ramp-up time of 2 hours, a reducing treatment temperature of 1,700° C. and a holding time of 2 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Example 4

Aside from setting the amount of 28 mass % ($CeO_2$ basis) aqueous cerium nitrate solution to 423 g and the amount of 18 mass % ($ZrO_2$ basis) aqueous zirconium oxynitrate solution to 623 g, a ceria-zirconia-based solid solution powder having a content ratio of cerium to zirconium ([cerium]:[zirconium]) of 43:57 by mole ratio was obtained in the same way as in Example 1, following which a ceria-zirconia-based composite oxide having a content ratio of cerium to zirconium ([cerium]:[zirconium]) of 43:57 by mole ratio was obtained in the same way as in Example 3. Particle size distribution measurement tests, x-ray diffractometry and measurement of the oxygen storage capacities were carried out in the same way as in Example 1 on the resulting ceria-zirconia-based composite oxides. The results are shown in Table 1 (FIG. 1).

Example 5

Aside from setting the amount of 28 mass % ($CeO_2$ basis) aqueous cerium nitrate solution to 491 g and the amount of 18 mass % ($ZrO_2$ basis) aqueous zirconium oxynitrate solution to 547 g, a ceria-zirconia-based solid solution powder having a content ratio of cerium to zirconium ([cerium]:[zirconium]) of 50:50 by mole ratio was obtained in the same way as in Example 1, following which a ceria-zirconia-based composite oxide having a content ratio of cerium to zirconium ([cerium]:[zirconium]) of 50:50 by mole ratio was obtained in the same way as in Example 3. Particle size distribution measurement tests, x-ray diffractometry and measurement of the oxygen storage capacities were carried out in the same way as in Example 1 on the resulting ceria-zirconia-based composite oxides. The results are shown in Table 1 (FIG. 1).

Example 6

Aside from setting the amount of 28 mass % ($CeO_2$ basis) aqueous cerium nitrate solution to 541 g and the amount of 18 mass % ($ZrO_2$ basis) aqueous zirconium oxynitrate solution to 492 g, a ceria-zirconia-based solid solution powder having a content ratio of cerium to zirconium ([cerium]:[zirconium]) of 55:45 by mole ratio was obtained in the same way as in Example 1, following which a ceria-zirconia-based composite oxide having a content ratio of cerium to zirconium ([cerium]:[zirconium]) of 55:45 by mole ratio was obtained in the same way as in Example 3. Particle size distribution measurement tests, x-ray diffractometry and measurement of the oxygen storage capacity were carried out in the same way as in Example 1 on the resulting ceria-zirconia-based composite oxides. The results are shown in Table 1 (FIG. 1).

Example 7

Aside from setting the pressure in the press-molding step to 3,000 kgf/cm$^2$, setting the reducing treatment conditions in the first reducing treatment to a ramp-up time of 3 hours, a reducing treatment temperature of 1,500° C. and a holding time of 3 hours, and setting the reducing treatment conditions in the second reducing treatment to a ramp-up time of 2 hours, a reducing treatment temperature of 1,700° C. and a holding time of 2 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacities were carried out in the same way as in Example 1 on the resulting ceria-zirconia-based composite oxide. The results are shown in Table 1 (FIG. 1).

Example 8

Aside from setting the amount of 28 mass % ($CeO_2$ basis) aqueous cerium nitrate solution to 472 g and the amount of 18 mass % ($ZrO_2$ basis) aqueous zirconium oxynitrate solution to 569 g, a ceria-zirconia-based solid solution powder having a content ratio of cerium to zirconium ([cerium]:[zirconium]) of 48:52 by mole ratio was obtained in the same way as in Example 1, following which a ceria-zirconia-based composite oxide having a content ratio of cerium to zirconium ([cerium]:[zirconium]) of 48:52 by mole ratio was obtained in the same way as in Example 3. Particle size distribution measurement tests, x-ray diffractometry and measurement of the oxygen storage capacities were carried out in the same way as in Example 1 on the resulting ceria-zirconia-based composite oxides. The results are shown in Table 1 (FIG. 1).

Comparative Example 1

Aside from not carrying out press-molding, setting the reducing treatment conditions in the first reducing treatment to a ramp-up time of 3 hours, a reducing treatment temperature of 1,500° C. and a holding time of 3 hours, and setting the reducing treatment conditions in the second reducing treatment to a ramp-up time of 2 hours, a reducing treatment temperature of 1,700° C. and a holding time of 2 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Comparative Example 2

Aside from setting the pressure in the press-molding step to 500 kgf/cm$^2$, setting the reducing treatment conditions in the first reducing treatment to a ramp-up time of 2 hours, a reducing treatment temperature of 1,400° C. and a holding time of 5 hours, not carrying out the second reducing treatment and subsequently cooling to 1,000° C. over a cooling time of 4 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Comparative Example 3

Aside from setting the pressure applied in the press-molding step to 2,000 kgf/cm$^2$, setting the reducing treatment conditions in the first reducing treatment to a ramp-up time of 3 hours, a reducing treatment temperature of 1,700° C. and a holding time of 5 hours, not carrying out the second reducing treatment and subsequently cooling to 1,000° C. over a cooling time of 4 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Comparative Example 4

Aside from setting the pressure in the press-molding step to 4,000 kgf/cm$^2$, setting the reducing treatment conditions in the first reducing treatment to a ramp-up time of 3 hours, a reducing treatment temperature of 1,500° C. and a holding time of 3 hours, and setting the reducing treatment conditions in the second reducing treatment to a ramp-up time of 2 hours, a reducing treatment temperature of 1,700° C. and a holding time of 2 hours, the ceria-zirconia-based solid solution powder obtained in Example 1 was used to obtain a ceria-zirconia-based composite oxide in the same way as in Example 1. A particle size distribution measurement test, x-ray diffractometry and measurement of the oxygen storage capacity were carried out in the same way as in Example 1 on the resulting ceria-zirconia-based composite oxide. The results are shown in Table 1 (FIG. 1).

Comparative Example 5

Aside from setting the amount of 28 mass % (CeO$_2$ basis) aqueous cerium nitrate solution to 413 g and the amount of 18 mass % (ZrO$_2$ basis) aqueous zirconium oxynitrate solution to 634 g, a ceria-zirconia-based solid solution powder having a content ratio of cerium to zirconium ([cerium]:[zirconium]) of 42:58 by mole ratio was obtained in the same way as in Example 1, following which a ceria-zirconia-based composite oxide having a content ratio of cerium to zirconium ([cerium]:[zirconium]) of 42:58 by mole ratio was obtained in the same way as in Example 3. Particle size distribution measurement tests, x-ray diffractometry and measurement of the oxygen storage capacities were carried out in the same way as in Example 1 on the resulting ceria-zirconia-based composite oxides. The results are shown in Table 1 (FIG. 1).

Comparative Example 6

Aside from setting the amount of 28 mass % (CeO$_2$ basis) aqueous cerium nitrate solution to 550 g and the amount of 18 mass % (ZrO$_2$ basis) aqueous zirconium oxynitrate solution to 481 g, a ceria-zirconia-based solid solution powder having a content ratio of cerium to zirconium ([cerium]:[zirconium]) of 56:44 by mole ratio was obtained in the same way as in Example 1, following which a ceria-zirconia-based composite oxide having a content ratio of cerium to zirconium ([cerium]:[zirconium]) of 56:44 by mole ratio was obtained in the same way as in Example 3. Particle size distribution measurement tests, x-ray diffractometry and measurement of the oxygen storage capacities were carried out in the same way as in Example 1 on the resulting ceria-zirconia-based composite oxides. The results are shown in Table 1 (FIG. 1).

As is apparent by comparing the results from Examples 1 to 8 with the results from Comparative Examples 1 to 6 shown in Table 1 (FIG. 1), in those cases where ceria-zirconia-based solid solution powders having a content ratio of cerium to zirconium ([cerium]:[zirconium]) in the range of 43:57 to 55:45 by mole ratio obtained by the production method according to the example of the invention were used, the pressure applied in the press-molding step was from 1,500 to 3,500 kgf/cm$^2$, the temperature in the first reducing treatment was in the range of 1,400 to 1,550° C. and the temperature in the second reducing treatment was in the range of 1,600 to 2,000° C. (Examples 1 to 8), it was confirmed that ceria-zirconia-based composite oxides according to the example of the invention are obtained which simultaneously satisfy the following three conditions: primary particles having a particle diameter of 1.5 to 4.5 µm in the ceria-zirconia-based composite oxide account for, on a particle number basis, at least 50% of all primary particles of the composite oxide; the I(14/29) value≥0.15; and the I(28/29) value≤0.08. Moreover, the ceria-zirconia-based composite oxides of the invention (Examples 1 to 8) were confirmed to have both an oxygen storage capacity and a heat resistance that are sufficiently good and to moreover exhibit, even after long-term exposure to elevated temperatures, a sufficiently good oxygen storage capacity.

By contrast, in composite oxides of ceria and zirconia wherein primary particles having a particle diameter of 1.5 to 4.5 µm account for less than 50% of all primary particles in the composite oxide (Comparative Examples 1 and 2), it was confirmed that the pyrochlore phase had a decreased heat resistance and the oxygen storage capacity was poor.

In a case where the Ce/Zr ratio in the composite oxide of ceria and zirconia and the pressure conditions in the press-molding step fell within the prescribed range but a two-stage reducing treatment was not carried out (Comparative Example 4), it was confirmed that a good oxygen storage capacity was not exhibited.

In cases where primary particles having a particle diameter of 1.5 to 4.5 μm in the complex oxide of ceria and zirconia account for a percentage of all primary particles in the composite oxide that falls within the prescribed range, but the I(14/29) value or the I(28/29) value falls outside the prescribed range (Comparative Examples 4 to 6), it was confirmed that a good oxygen storage capacity was not exhibited.

As explained above, this invention makes it possible to provide ceria-zirconia-based composite oxides which are endowed with both a sufficiently good oxygen storage capacity and a sufficiently high heat resistance, and which moreover are capable of exhibiting a sufficiently good oxygen storage capacity even after long-term exposure to elevated temperatures; a method of producing such ceria-zirconia-based composite oxides; and exhaust gas purification catalysts which use such ceria-zirconia-based composite oxides.

Because the ceria-zirconia-based composite oxides according to the examples of the invention are thus endowed with both a sufficiently good oxygen storage capacity and a sufficiently high heat resistance, they can be advantageously used as, for example, supports, promoters and catalyst atmosphere modifiers for exhaust gas purification catalysts.

What is claimed is:

1. A method for producing a ceria-zirconia-based composite oxide containing a composite oxide containing ceria and zirconia, the method comprising:
providing a ceria-zirconia-based solid solution powder having a content ratio of cerium to zirconium in a range of 43:57 to 55:45 by mole ratio;
press-molding the ceria-zirconia-based solid solution powder under a pressure of 1,500 to 3,500 kgf/cm$^2$;
subjecting a ceria-zirconia-based solid solution powder compact to a first reducing treatment including 0.5 to 24 hours of heat treatment under reducing conditions at a temperature between 1,400 and 1,550° C.; and
subjecting the first reduction-treated ceria-zirconia-based solid solution powder compact to a second reducing treatment including 0.5 to 5 hours of heat treatment under reducing conditions at a temperature that is between 1,600 and 2,000° C. and at least 100° C. higher than the temperature in the first reducing treatment so as to obtain a ceria-zirconia-based composite oxide comprising a composite oxide containing ceria and zirconia, wherein primary particles having a particle diameter of 1.5 to 4.5 μm in the ceria-zirconia-based composite oxide account for, on a particle number basis, at least 50% of all primary particles in the composite oxide, and a content ratio of cerium to zirconium in the ceria-zirconia-based composite oxide is in a range of 43:57 to 55:45 by mole ratio; and when heated for 5 hours in the atmosphere under a temperature condition of 1,100° C. and thereafter examined by X-ray diffractometry using CuKα, the ceria-zirconia-based composite oxide exhibits an X-ray diffraction pattern in which an intensity ratio of diffraction line at a 2θ of 14.5° to diffraction line at a 2θ of 29° {I(14/29)} and an intensity ratio of diffraction line at a 2θ of 28.5° to diffraction line at a 2θ of 29° {I(28/29)} satisfy requirement I(14/29)≥0.015 and I(28/29)≤0.08.

2. The method for producing a ceria-zirconia-based composite oxide according to claim 1, further comprising, following the second reducing treatment, subjecting the ceria-zirconia-based composite oxide to oxidation treatment.

* * * * *